US008553385B2

(12) United States Patent
Ahlert

(10) Patent No.: US 8,553,385 B2
(45) Date of Patent: Oct. 8, 2013

(54) RELEASE FOR AN ELECTRIC SWITCHING ARRANGEMENT

(75) Inventor: Torsten Ahlert, Fürstenwalde (DE)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 13/260,743

(22) PCT Filed: Mar. 26, 2010

(86) PCT No.: PCT/EP2010/053995
§ 371 (c)(1), (2), (4) Date: Sep. 28, 2011

(87) PCT Pub. No.: WO2010/112420
PCT Pub. Date: Oct. 7, 2010

(65) Prior Publication Data

US 2012/0026638 A1 Feb. 2, 2012

(30) Foreign Application Priority Data

Mar. 31, 2009 (DE) ........................ 10 2009 015 126

(51) Int. Cl.
*H02H 3/08* (2006.01)

(52) U.S. Cl.
USPC .......................................................... 361/102

(58) Field of Classification Search
USPC .......................................................... 361/102
See application file for complete search history.

(56) References Cited

U.S. PATENT DOCUMENTS

| | | | | |
|---|---|---|---|---|
| 3,631,369 | A | 12/1971 | Menocal | |
| 5,103,198 | A * | 4/1992 | Morel et al. | 335/6 |
| 6,281,458 | B1 * | 8/2001 | Castonguay et al. | 218/22 |
| 2005/0151607 | A1 * | 7/2005 | Li et al. | 335/132 |
| 2006/0077023 | A1 | 4/2006 | Oh | |

FOREIGN PATENT DOCUMENTS

| | | | |
|---|---|---|---|
| DE | 69110540 | T2 | 2/1996 |
| DE | 69217441 | T2 | 7/1997 |
| DE | 10013161 | B4 | 2/2004 |
| DE | 102008005101 | A1 | 7/2009 |

(Continued)

OTHER PUBLICATIONS

Energetiche Selektivität in Niederspannungsnetzen Schneider Electric, Technisches Heft No. 167; Magazine; 1994.

(Continued)

*Primary Examiner* — Jared Fureman
*Assistant Examiner* — Kevin J Comber
(74) *Attorney, Agent, or Firm* — Harness, Dickey & Pierce, P.L.C.

(57) ABSTRACT

A release for an electrical switching arrangement includes at least two switching contacts, which are arranged in a housing and are isolated if the current flowing via the switching contacts has exceeded a predetermined threshold value. The release includes an actuating element, which responds, counter to the force of a restraining apparatus, to a pressure which is generated by an arc occurring in an isolating zone of the switching contacts. The isolating zone is surrounded by the housing, and actuates a shutdown mechanism which brings about automatic interruption of the current path. The actuating element has a movable element, which forms a blocking element in a flow channel, which is connected to the isolating zone. The blocking element performs a predetermined control movement at the pressure which is intended to result in shutdown.

14 Claims, 9 Drawing Sheets

(56) References Cited

FOREIGN PATENT DOCUMENTS

| | | | |
|---|---|---|---|
| EP | 0455564 | B1 | 6/1991 |
| EP | 0538149 | B1 | 4/1993 |
| EP | 1538653 | A1 | 6/2005 |
| EP | 1266387 | B1 | 8/2007 |
| WO | WO 0163635 | A1 | 8/2001 |

OTHER PUBLICATIONS

International Search Report, Mar. 25, 2011.

German priority document DE 102009015126.5 filed Mar. 31, 2009.

* cited by examiner

RELEASE FOR AN ELECTRIC SWITCHING ARRANGEMENT

PRIORITY STATEMENT

This application is the national phase under 35 U.S.C. §371 of PCT International Application No. PCT/EP2010/053995 which has an International filing date of Mar. 26, 2010, which designates the United States of America, and which claims priority on German patent application number DE 10 2009 01 126.5 filed Mar. 31, 2009, the entire contents of each of which are hereby incorporated herein by reference.

FIELD

At least one embodiment of the invention generally relates to a release for an electric switching arrangement. More specifically, in at least one embodiment, it relates to a release for an electric switching arrangement which is arranged in the course of a first current path and comprises at least two switching contacts which are arranged in a housing and are separated if the current flowing via the switching contacts exceeds a predetermined threshold value, and also comprises an actuating element which responds, against the force of a restraining apparatus, to a pressure generated by an electric arc struck in the event of electrodynamic recoil of the switching contacts in a separating zone of the switching contacts, the zone being surrounded by the housing, and actuates a shutdown mechanism which brings about automatic interruption of the current path, wherein the actuating element has a movable element which forms a blocking element in a flow channel connected to the separating zone, the blocking element carrying out a control movement in the presence of the pressure which is intended to result in a shutdown.

At least one embodiment of the invention also generally relates to an electric switching arrangement having a release of this type.

At least one embodiment of the invention further relates in particular to current-limiting switching arrangements in the low voltage range, i.e. up to voltages of approximately 1000 Volt.

BACKGROUND

Current-limiting switching arrangements are configured, in particular, for interrupting current paths in the event of a short-circuit or of an overvoltage. Current-limiting switching arrangements of this type can also be configured single-poled or multi-poled, in particular three-poled. For each switching pole, they can have one or more switching contact pairs. In particular, these electrical switching arrangements are configured for switching off currents of more than 100 A, in particular, of several kA.

In the use, for example, of current-limiting switching devices, in particular current-limiting circuit breakers in the form, for example, of MCCBs (molded case circuit breakers) in extensively branched power distribution networks, selective staggering of the switching devices involved, using a minimum nominal current separation, is usual. Each branching level can be protected against any overload or short-circuits occurring, depending on the consumer devices connected, using a correspondingly dimensioned switching device.

For example, a switching device which is arranged adjacent to a consumer, often designated a "consumer-local" or downstream switching device, is configured for the smallest nominal current. If a short-circuit current flows both through the consumer-local switching device and through a switching device which is arranged, in the hierarchy of the power distribution network, above the consumer-local switching device, often designated a "consumer-remote" or upstream switching device, then only the consumer-local switching device is to shut down. In other words, in the event of a fault (short-circuit), only the switching device which is closest to the event is to interrupt the current flow.

The switching contact pairs of the consumer-local and of the consumer-remote switching device strike an electric arc on opening, wherein the opening width of the switching contact pairs and the arc energy are greater in the case of the consumer-local switching device due to the lower moment of inertia of the movable current path thereof including the switching contacts. This opening which may, under certain circumstances, be only single-poled must follow an all-pole shutdown of the consumer-local switching device. The consumer-remote switching device must not shut down, in order not to separate other consumers from the power supply network. The consumer-remote switching device may, however, act supportively by brief lifting of the switching contacts, for example, contribute to the shutdown of the consumer-local switching device by current limiting.

Switching devices which act in such a staggered manner in power distribution networks act selectively. In order to achieve this selectivity, it is necessary that the switching devices closest to the fault interrupt the current paths of all the switching poles more rapidly than the higher-level switching devices.

Generic releases and switching arrangements with releases of this type which are suitable for such rapid interruption of current paths are known, for example, from the German translation DE 691 10 540 T2 of the European patent specification EP 0 455 564 B1 and from the German translation DE 692 17 441 T2 of the European patent specification EP 0 538 149 B1.

The cited documents DE 691 10 540 T2 and DE 692 17 441 T2 each show, in particular, an electrical switching arrangement in the form of a circuit breaker with an insulating material housing which, for each switching pole, comprises two switching contacts pressed, in the switched on condition, against one another by spring force. The switching contacts can be separated by the effect of electrodynamic recoil forces if the current flowing through the switching contacts exceeds a predetermined threshold value, in order to bring about a limitation of the current. The circuit breaker comprises an overload and/or short-circuit detection member to send a signal, in the event of a fault, to a shutdown mechanism effecting the automatic shutdown of the circuit breaker. The circuit breaker also comprises an actuating element which responds to an excess pressure generated in the separating zone of the switching contacts by an electric arc struck in the event of electrodynamic recoil of the switching contacts, in order to actuate the shutdown mechanism of the circuit breaker. The actuating member is a gas-tight unit which is exclusively connected to the separating zone of the switching contacts and comprises a movable element, for example, a piston or a membrane with a limited control travel.

Applied to the movable element is firstly the excess pressure and secondly, by way of a retrieving apparatus, a suitable effective force. The displacement of the movable element causes the release of the shutdown mechanism of the circuit breaker, wherein the retrieving apparatus is dimensioned with a suitable effective force such that unintentional release in the event of simple overload or the response of a downstream current-limiting circuit breaker is prevented.

The shutdown mechanism of the circuit breaker shown can also be released both by the overload and/or short-circuit detecting element as well as by the actuating element which acts independently thereof. The release criterion made use of is the excess pressure generated when the electric arc is struck and which is in direct relationship to the arc energy. In other words, the pressure increases with increasing arc energy. Therefore, by evaluating the excess pressure, energy-selective shutdown of the circuit breaker is possible, wherein the energy-selectiveness represents a type of selectivity used particularly in low voltage power supply networks for shutdown in the event of a short-circuit, as described in the document “Energetische Selektivität in Niederspannungsnetzen” [Energy-selectivity in low voltage power supply networks], Schneider Electric, Technical volume No. 167, published May 1994.

Other releases of this type and circuit breakers of this type are known from the documents U.S. Pat. No. 3,631,369 A and EP 1 266 387 B1 and DE 100 13 161 B4. These each include an actuating element in the form of a lever which forms a blocking surface in a gas discharge channel for actuating a shutdown mechanism. The actuating member is deflected by a gas stream which flows into the gas discharge channel as a result of an excess pressure generated by the electric arc.

SUMMARY

At least one embodiment of the invention provides an alternative release.

Advantageous embodiments are disclosed in the dependent claims.

According to at least one embodiment of the invention, the movable element is mounted such that the movement path of the blocking element thereof extends in a plane which lies transversely to the flow direction of the flow channel.

A release designed in this way can, in addition to the dynamic portion of the gas pressure acting in the flow direction and known as “dynamic pressure”, also make use of a pressure difference of the static portion of the gas pressure acting transversely to the flow direction leading to lifting of the blocking element, in order to set the response point (of the release criterion) of the release.

Furthermore, the release according to at least one embodiment of the invention does not involve a gas-tight unit as disclosed in the documents DE 691 10 540 T2 and DE 692 17 441 T2. The release according to at least one embodiment of the invention therefore does not place such great demands on the tightness of the housing parts carrying gas and therefore permits greater dimensional tolerances during manufacturing.

Conversion of the pressure into the control movement of the movable element also occurs by individual switching poles, even given a plurality of switching poles, so that regardless thereof in which of the switching poles the switching contacts are separated due to a short-circuit, the respective movable element responds equally rapidly in order to actuate the shutdown mechanism. Gas-tight pressure lines extending transversely to the switching poles, as known from documents DE 691 10 540 T2 or DE 692 17 441 T2, are not needed.

Example embodiments of the invention provide that the movable element is displaceable along an axis extending transversely to the flow direction or is rotatable about an axis extending parallel to the flow direction.

In order to seal a through-aperture of a wall surface of the flow channel penetrated by the movable element, the wall surface having a circular arc-shaped cross-section bent about the axis, the movable element can be provided with a screen bent to correspond to the wall surface and lying opposing the wall surface.

In an example embodiment of the release according to the invention, it is provided that in order to adjust the lifting force acting on the blocking element, the blocking element is configured asymmetrically in the manner of an aerofoil.

In a further example embodiment of the release according to the invention, in order to adjust the dynamic pressure acting on the blocking element, shaped elements are provided in the flow channel.

The movable element can actuate the shutdown mechanism indirectly or at least actuate an intermediate element, wherein the intermediate element can be displaceable along an axis extending transversely to the flow direction.

For the transmission of force, the movable element and/or the intermediate element can be provided with a force deflecting inclined surface.

BRIEF DESCRIPTION OF THE DRAWINGS

The invention and advantageous embodiments of the invention will now be described in greater detail, making reference to the drawings, in which.

DETAILED DESCRIPTION OF THE EXAMPLE EMBODIMENTS

Figure 1:
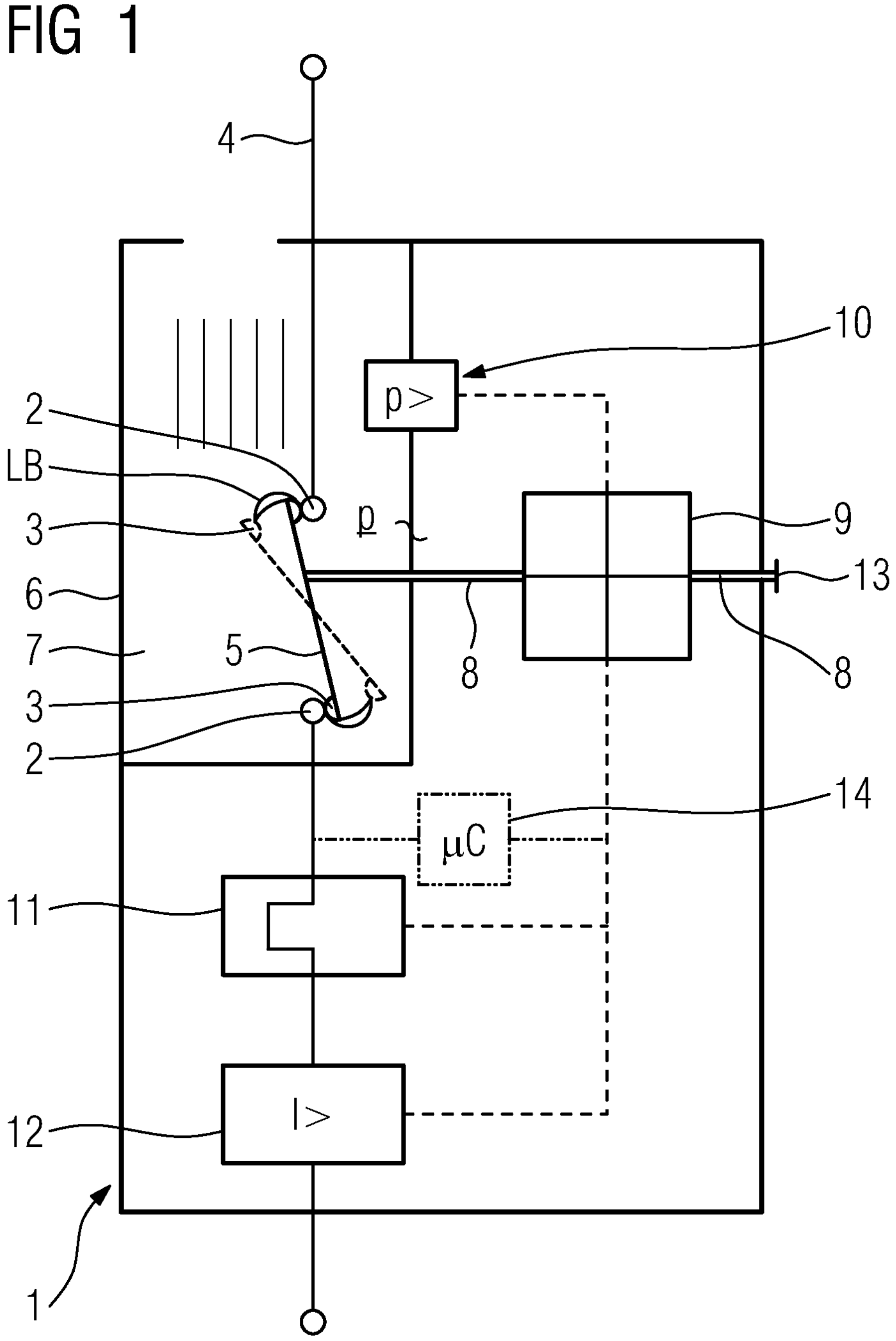
FIG. 1 shows a schematic representation of an electrical switching arrangement comprising a release according to an embodiment of the invention as the pressure detecting element.

FIG. 1 shows schematically an electrical switching arrangement 1 in the form of a single electrical switching device (for example, a low voltage circuit breaker) with two switching contacts 2, 3 for interrupting a first current path 4 of a first switching pole. A movable switching contact 2 is carried by a rigid switching contact 5. The electrical switching device has a first switching chamber 7 delimited by a housing 6 for receiving the switching contacts 2, 3 of the first current path. A drive mechanism 8 of the electrical switching device serves to open and close the switching contacts. The electrical switching device also comprises a shutdown mechanism 9 in the form of a latching mechanism arranged in the path of the drive mechanism 8 and a release 10 in the form of a pressure detecting element.

In a first switching chamber 7, a pressure p is generated by way of an electric arc LB struck in the event of electrodynamic recoil of the switching contacts 2, 3, under the effect of the pressure the release 10 (the pressure detecting element) brings about a release of the shutdown mechanism 9—i.e. release of the latching of the latching mechanism—in order to bring into motion the drive mechanism 8 to open the switching contacts 2, 3. The pressure detecting element forms an energy-selective release, since the pressure p generated is essentially proportional to the energy of the struck electric arc LB.

Provided in the electrical switching device 1, apart from the release 10 (as a pressure detecting element) are a thermal release 11 (as an overload detection element), an electromagnetic release 12 (as a short-circuit detection element) and a manual release 13, by way of which the latching mechanism can be released to open the switching contacts. An electronic release 14—that is, an ETU (electronic trip unit)—can also be provided.

The electrical switching device 1 can include further switching chambers arranged in parallel to the switching chamber 7 shown in FIG. 1, in which further switching poles are arranged.

Figure 3:
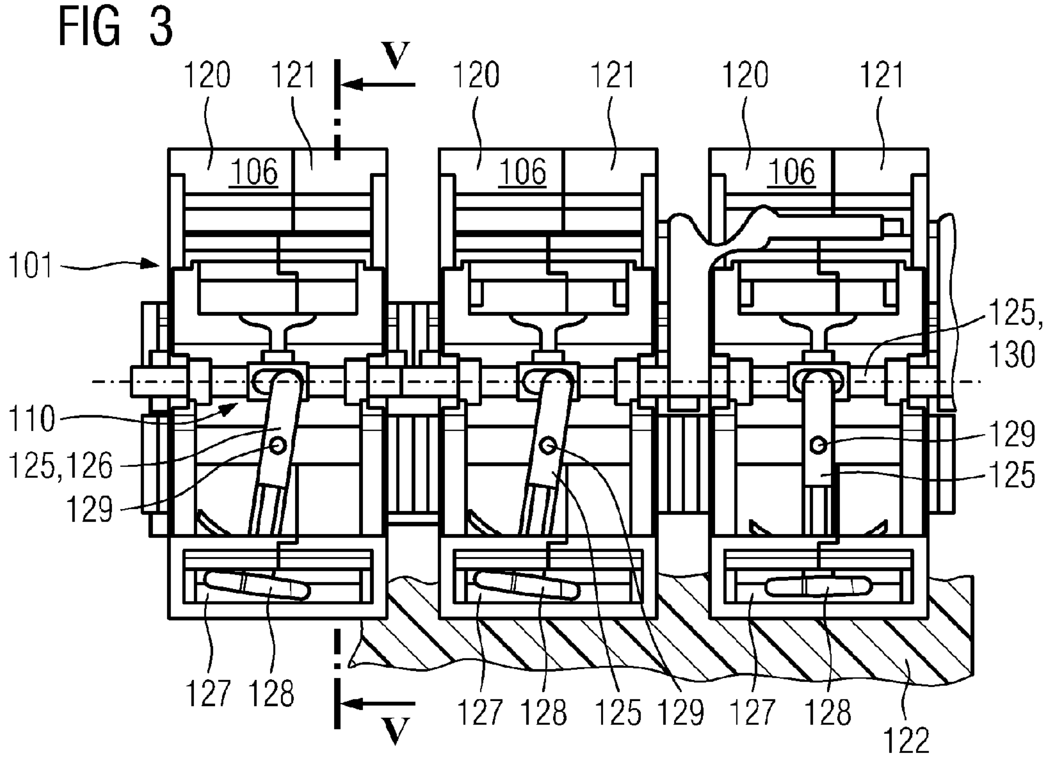
Figure 5:
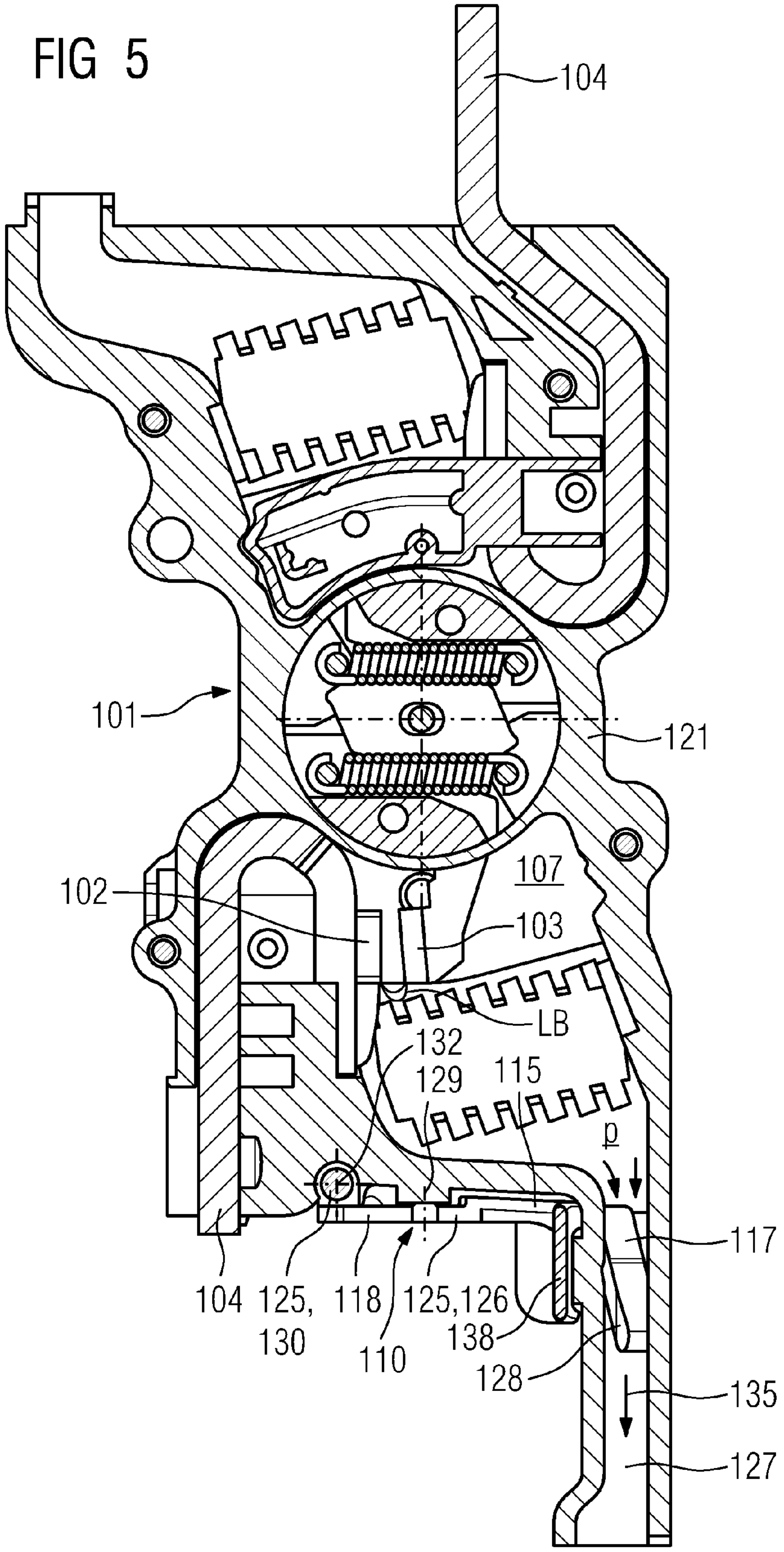

FIG. 3 shows a first embodiment 101 of the electrical switching device wherein three housings 106 (also known as pole housings or pole cassettes), each comprising two pole half shells 120, 121, each of which, as FIG. 5 shows, forms a switching chamber 107 for accommodating the switching contacts 102, 103 of a switching pole.

According to FIG. 3, the three housings 106 are inserted into a common outer housing 122 (switchgear housing), which is shown here only schematically.

According to FIG. 5, which shows a portion of the section identified in FIG. 3 as V-V, the release 101 includes an actuating element identified as a whole as 125, which responds to the pressure p generated in the separating zone of the switching contacts 102, 103 by way of the electric arc LB struck in the event of electrodynamic recoil of the switching contacts. The actuating member 125 has a movable element 126 in the form of a two-armed lever which forms a blocking element 128 in the flow channel 127 connected to the separating zone—in this case, the discharge channel of the switching pole of the electrical switching device 101 shown—which, in the presence of the pressure p which is intended to lead to shutdown, performs a predetermined control movement.

Figure 2:
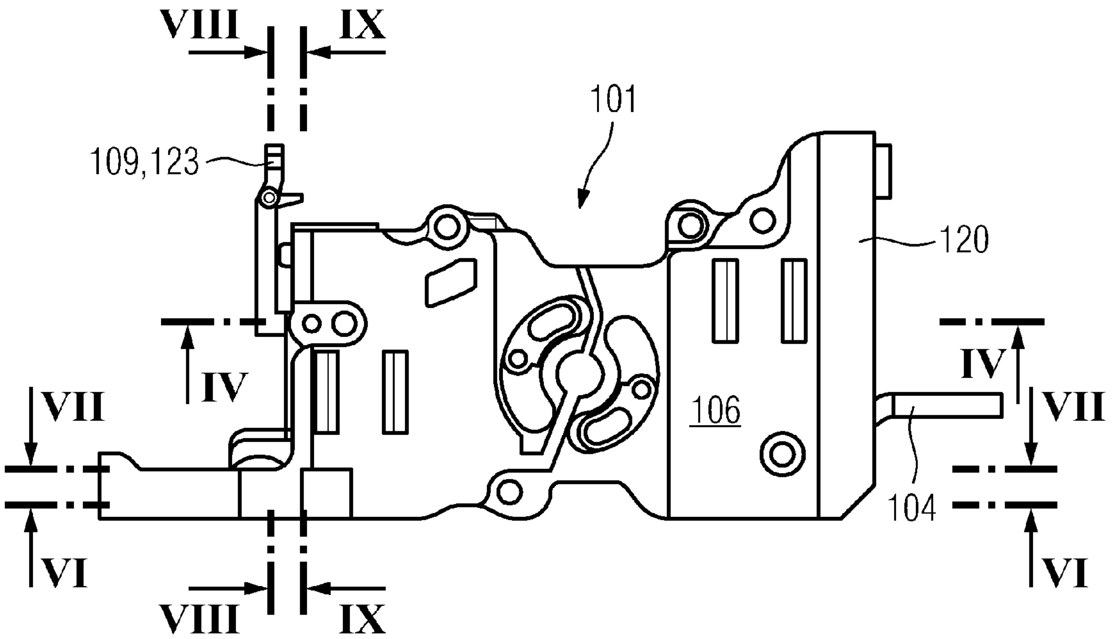
FIGS. 2 to 9 show a first electrical switching arrangement according to an embodiment of the invention in the form of a current-limiting low voltage circuit breaker having a first embodiment of the release according to the invention as the pressure detecting element, wherein the movable element which forms a blocking element in a flow channel connected to the separating zone is rotatable about an axis parallel to the flow direction.
Figure 6:
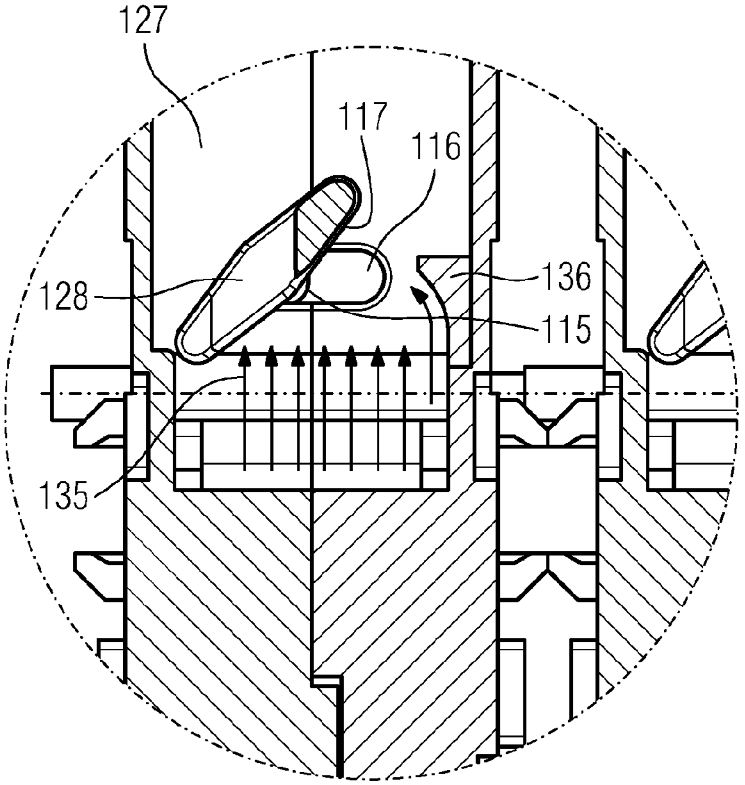
Figure 7:
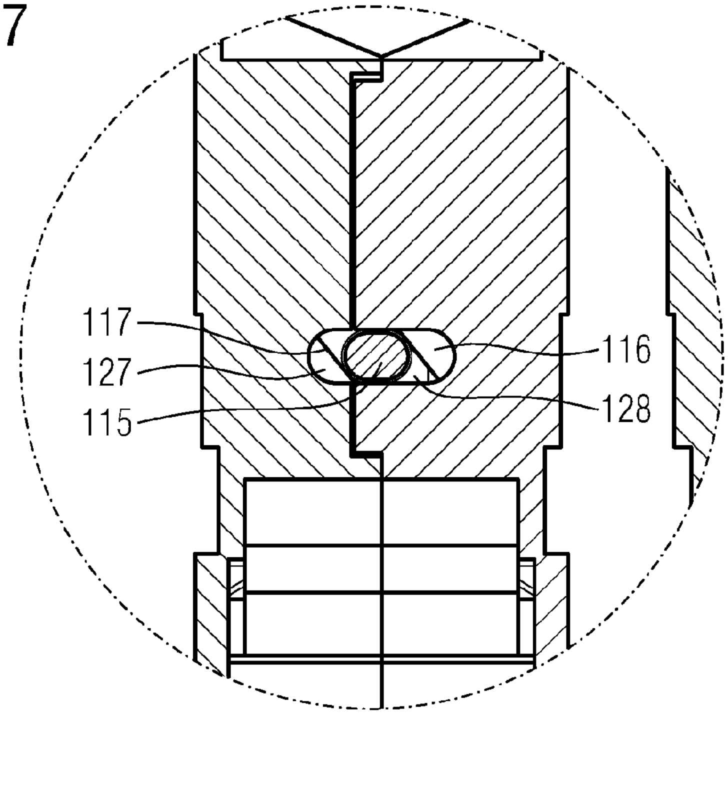

According to FIGS. 6 and 7, which show the portions of the sections denoted in FIG. 2 as VI-VI and VII-VII, a first 115 of the lever arms of the movable element, the element being provided with the blocking element 128, extends through a through-aperture 116 in the flow channel 127, wherein the blocking element 128 (the flat contour 127 thereof) is arranged tilted at a predetermined angle (angle of attack) to the flow direction 135.

As FIG. 6 also shows, form elements 136 can be provided in the flow channel for adjusting the dynamic pressure acting on the blocking element 128.

Figure 9:
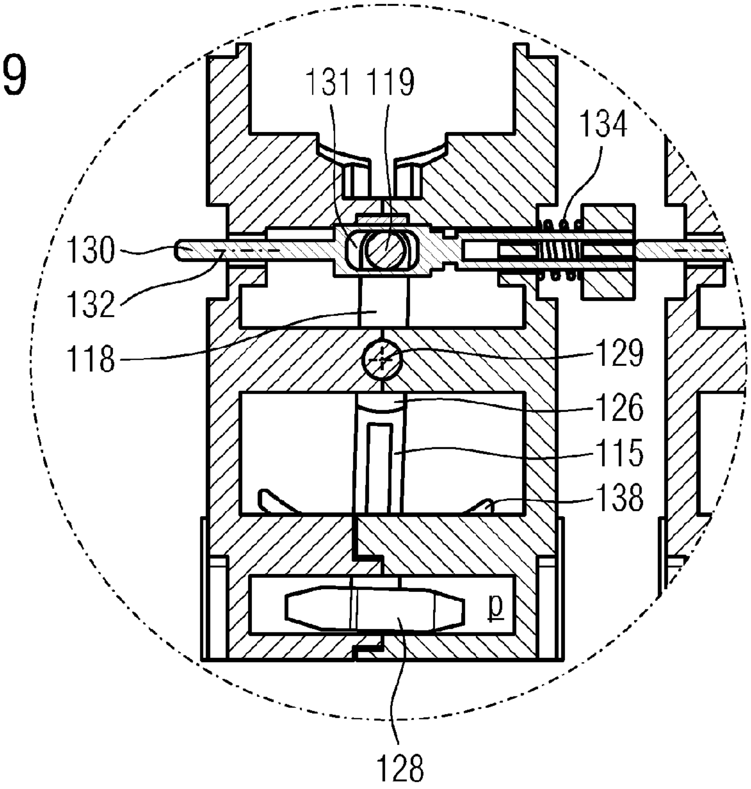

According to FIG. 9, the movable element 126, to the blocking body 128 of which the pressure p is applied, effects, by way of the position change thereof in the event of a predetermined control movement, in this case in the form of a predetermined pivot movement about the pivot axis 129 thereof, the release of the aforementioned shutdown mechanism by actuating an intermediate element 130 in the form of a grouped slider with which the movable elements 126 of the remaining switching poles are also associated, as shown in FIG. 3.

For this purpose, a second 118 of the lever arms of the movable element 126, having a pin 119 projecting parallel to the pivot axis 129 engages in an elongate groove 131 of the intermediate element 130. The ends of the elongate grooves

131 of the intermediate element 130 (of the grouped slider) simultaneously form stops which delimit the movement path (control path) of the movable elements.

The movable element 126 is mounted via the pivot axis 129 extending parallel to the flow direction 135 such that the movement path of the blocking element 128 thereof runs in a plane extending transversely to the flow direction 135 of the flow channel. With a suitably chosen form of the blocking element 128 and the attack angle thereof in the flow channel 127, in addition to the dynamic portion of the gas pressure acting in the flow direction 135, which is also designated "dynamic pressure", the pressure difference of the static portion of the gas pressure acting transversely to the flow direction 127 leading to the lifting of the blocking body 128 can be used for adjusting the response point (of the release criterion) of the release.

Figure 4:
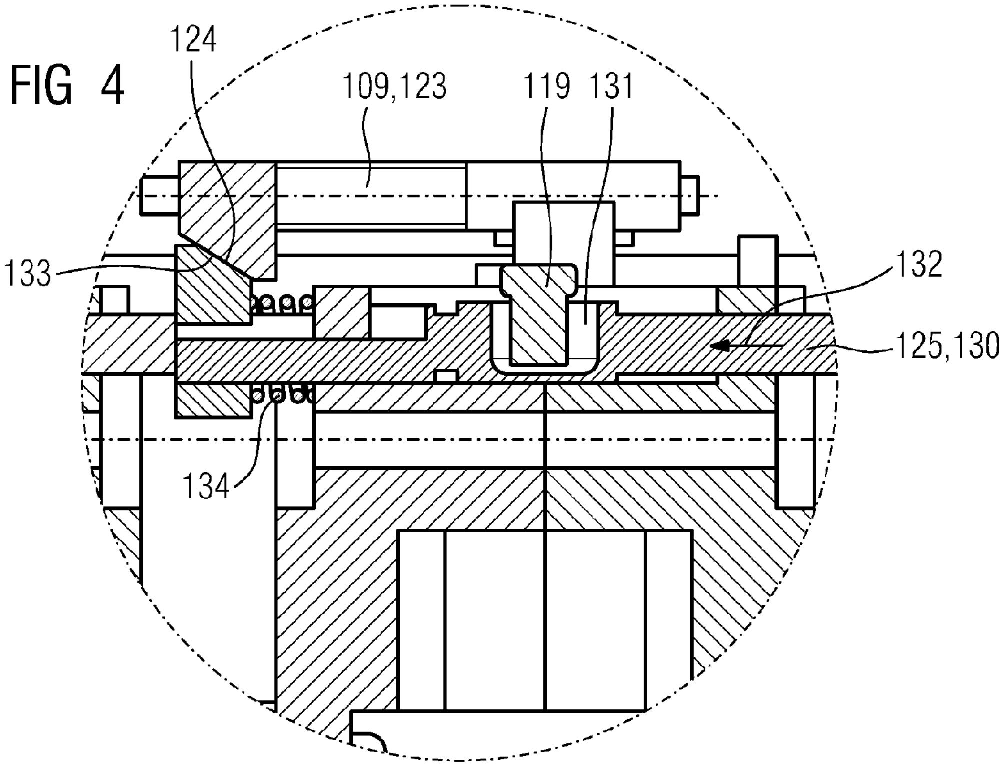

According to FIG. 4, which shows a portion of the section identified in FIG. 2 as IV-IV, the intermediate element 130 (of the grouped slider) is displaceable along an axis 132 which extends transversely to the flow direction 135 or transversely to the pivot axis 129 and is operatively connected via a first inclined surface 133 to a release shaft 123 of the shutdown mechanism, wherein the release shaft 123 has a second inclined surface 124 associated with the first inclined surface 133.

FIG. 4 also shows a restraining apparatus 134 which applies a suitable spring force, indirectly via the grouped slider 130, to the movable elements (see also FIG. 9). The operative force of the restraining apparatus 134 is dimensioned such that both unintentional release of the shutdown mechanism in the event of a simple overload and also the operation of a downstream current-limiting switching device are prevented.

Figure 8:
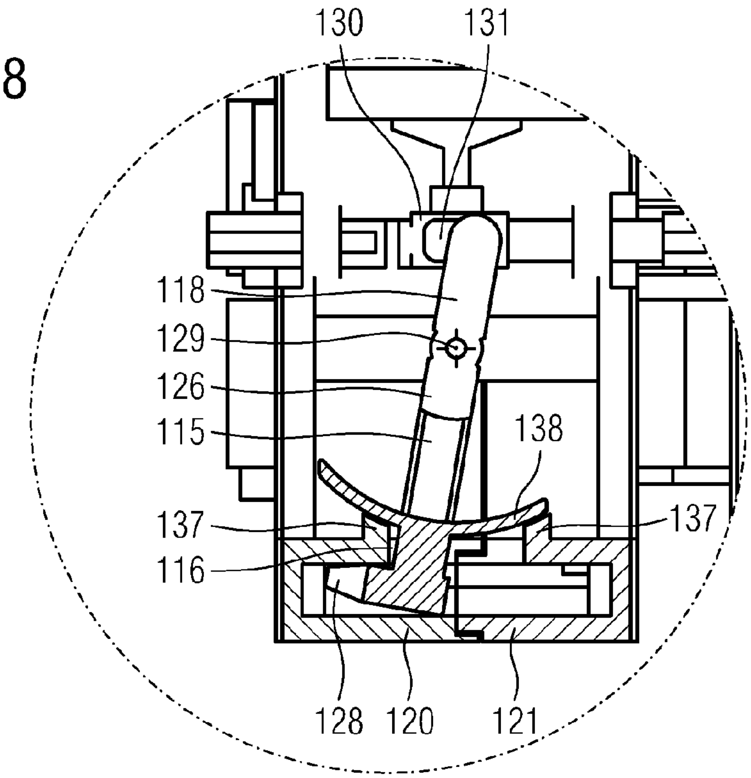

According to FIG. 8, the movable elements 126 and the intermediate element 130 are mounted on and between the pole half shells 120, 121 such that no additional fastening elements are required. The intermediate element 130 is composed of identically configured segments which can be plugged together, the number of which corresponds to the number of poles.

The resilience of the restraining apparatus 134 acting on one side on the intermediate element 130 forces the intermediate element 130 and all the movable elements 126 into a predefined starting position. Since each of the coupling sites is formed between the movable elements 126 and the intermediate element 130 by way of the engagement of one of the pins 119 in one of the elongate grooves 131 and is consequently provided with direction-dependent free movement, the pivot movement of one of the movable elements 126 of one of the switching poles does not lead to all the other movable elements 126 being carried along.

FIG. 8 shows also that the movable element for sealing the through-aperture 116 of the wall surface 137 of the flow channel penetrated by the movable element, the wall surface having a circular arc-shaped cross-section that is bent about the pivot axis 129, is provided with a screen 138 bent to correspond to the wall surface 137 and lying opposing the wall surface.

The release 110 according to an embodiment of the invention uses the gases streaming in the gas discharge channel after a shutdown procedure to derive an energy-selective release criterion in the form of the pivot movement of the movable element 126, which then leads, via the translationally displaceable intermediate element 130, to the release/shutdown of the electrical switching arrangement 1 (of the low voltage circuit breaker). Both the angle (angle of attack) and the outer form (in particular the contour 117) of the blocking body are aerodynamically optimized such that a deflection which is equivalent to the flow and is as reproducible as possible is generated. Thus both the resistance which the blocking body (in particular the contour 117) presents to the stream and the lift generated by the flow round the blocking body can be variably combined. Furthermore, the discharge channel can be geometrically designed with the form elements 136 such that the gas stream impinges optimally upon the planar contour 117 of the blocking body and flows optimally round the blocking body.

The release according to an embodiment of the invention can be mounted in a simple manner in and on the pole half shells 120, 121 of the housing 106.

Thereby that the second lever arm 118 is longer than the first lever arm 115, the release according to an embodiment of the invention also enables the derivation of a large control movement for actuating the shutdown mechanism.

Figure 10:
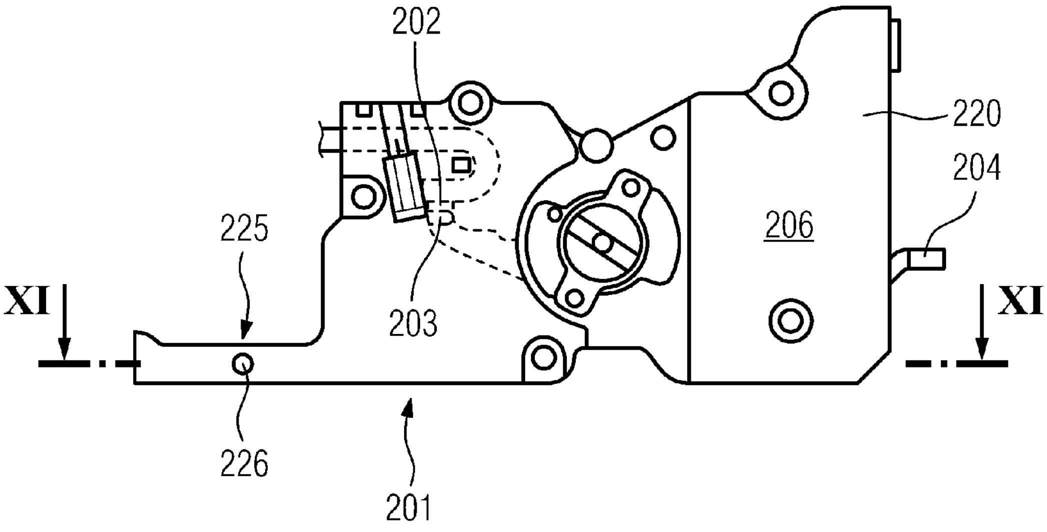
FIGS. 10 to 12 show a second electrical switching arrangement according to an embodiment of the invention in the form of a current-limiting low voltage circuit breaker with a second embodiment of the release according to the invention as the pressure detecting element, wherein the movable element which forms a blocking element in a flow channel connected to the separating zone is displaceable along an axis extending transversely to the flow direction.
Figure 11:
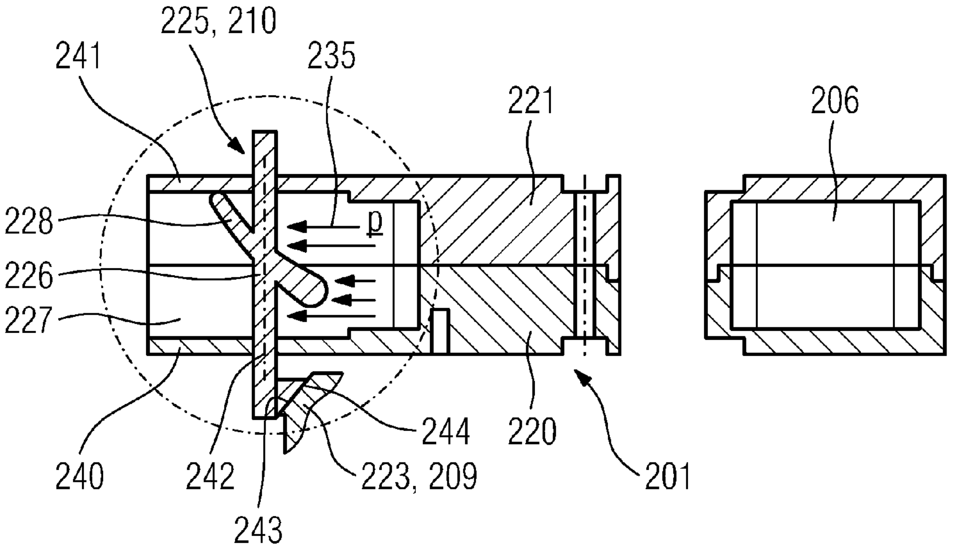

FIGS. 10 and 11 show a second embodiment 201 of the electrical switching device wherein the housings 206, each of which forms a switching chamber for accommodating the switching contacts of a switching pole, are each also formed from two pole half shells 220, 221 and are inserted into a common outer housing (not shown).

According to FIG. 11, which shows the section indicated as XI-XI in FIG. 10, the release 201 includes an actuating element identified as a whole as 225, which responds to the pressure generated in the separating zone of the switching contacts by the electric arc struck in the event of electrodynamic recoil of the switching contacts.

The actuating element 225 includes a movable element 226 in the form of a translationally displaceable shaft which is preferably secured against twisting, which forms a blocking body 228 in a flow channel 227 connected to the separating zone—in this case, also, the discharge channel of the illustrated switching pole of the electrical switching device 201—the blocking body carrying out a predetermined control movement given the pressure p which is intended to result in a shutdown.

The movable element 226 is displaceably mounted in mutually opposing wall sections 240, 241 of the pole half shells 220, 221 which form the flow channel 227 along an axis 242 extending transversely to the flow direction 235 such that the movement path of the blocking body 228 thereof also extends in a plane which extends transversely to the flow direction 235 of the flow channel 227. Thus here also, with a suitably selected form of the blocking body 228 and angle of attack thereof in the flow channel, in addition to the dynamic portion of the gas pressure acting in the flow direction, the pressure difference of the static portion of the gas pressure acting transversely to the flow direction can also be used for adjusting the response point (of the release criterion) of the release 210.

The movable element 226 is provided with a force-deflecting first inclined surface 243 for force transmission, which acts on an associated second inclined surface 244 of a release shaft 223 of the shutdown mechanism.

Figure 12:
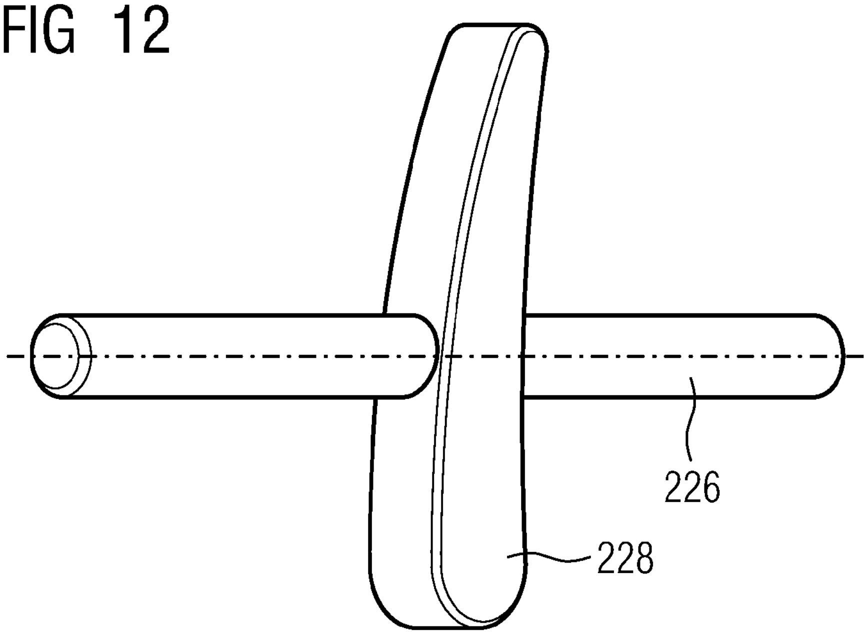
Figure 13:
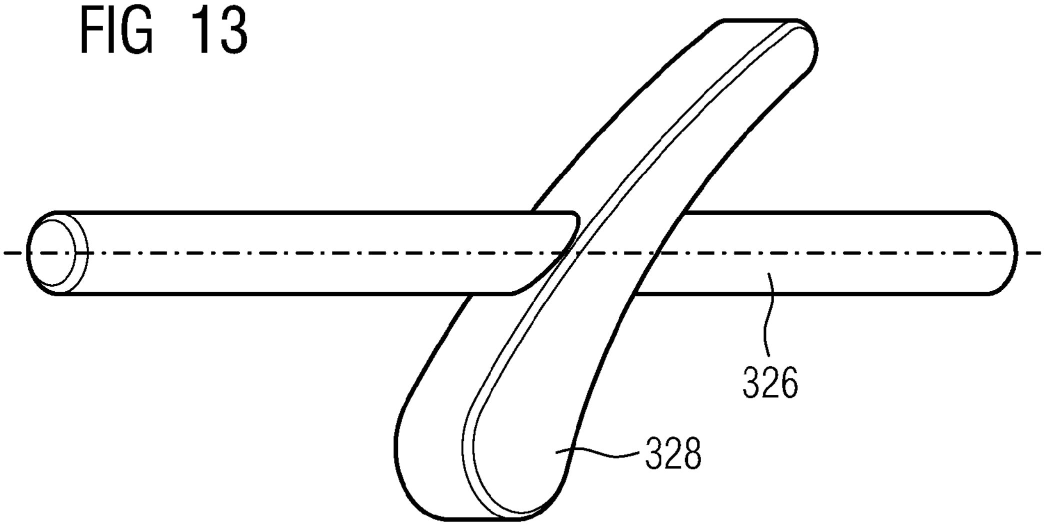
FIGS. 13 to 15 show various embodiments of the blocking element.

According to FIG. 12 which shows the movable element 226, the blocking body 228 for adjusting the lift acting on the blocking body is configured asymmetrically in the manner of an aerofoil. A further embodiment 328 of the blocking body is shown by FIG. 13 which is similarly asymmetric though longer and slimmer.

Figure 14:
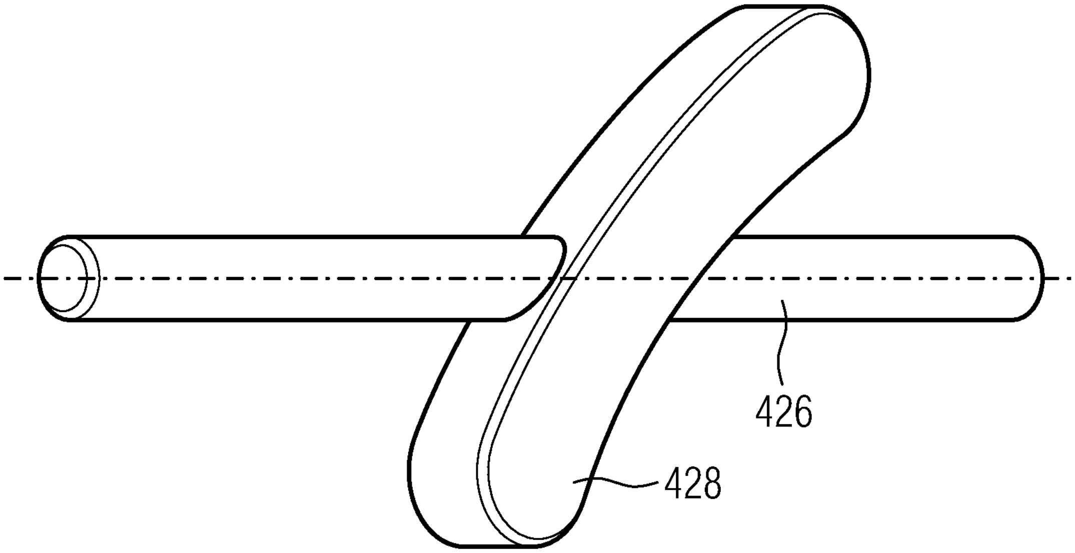
Figure 15:
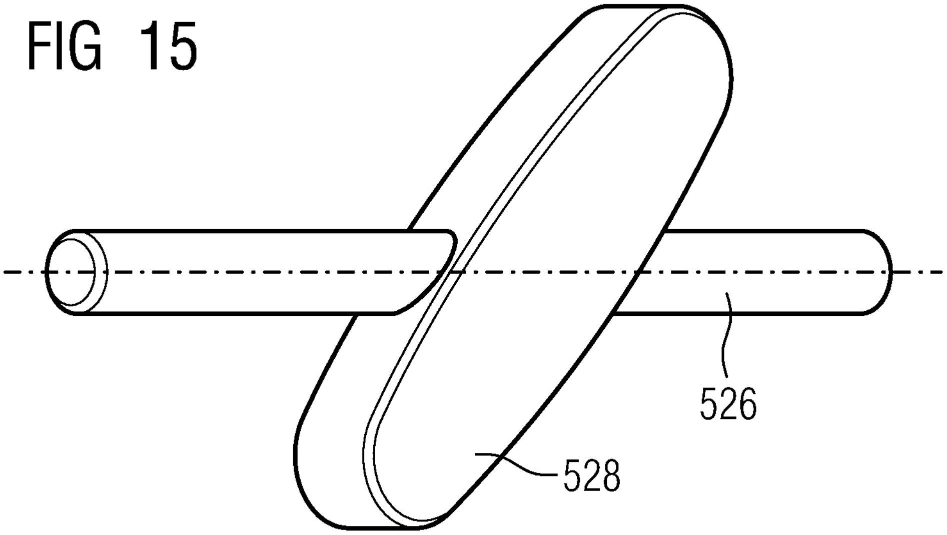

FIGS. 14 and 15 show further possible embodiments 428 and 528 of the blocking body.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A release for an electric switching arrangement arranged in the course of a current path, the release comprising:

at least two switching contacts, arranged in a housing and separated if a current flowing via the at least two switching contacts exceeds a threshold value; and an actuating element configured to respond, against a force of a restraining apparatus, to a gas pressure generated by an electric arc struck in an event of electrodynamic recoil of the at least two switching contacts in a separating zone of the at least two switching contacts, the separating zone being surrounded by the housing, the actuating element being configured to actuate a shutdown mechanism to bring about automatic interruption of the current path, wherein the actuating element includes, a movable element including a blocking element in a flow channel, the flow channel having a flow direction of the gas pressure and being connected to the separating zone, said blocking element being transverse to the flow direction of the gas pressure through the flow channel and configured to carry out a control movement in the presence of the gas pressure to result in a shutdown, the movable element being mounted such that a movement path of the blocking element extends in a plane which lies transversely to the flow direction of the flow channel, the blocking element being configured to control a flow of the gas pressure through the flow channel based on a force applied to the blocking element by the gas pressure.

2. The release as claimed in claim 1, wherein the movable element is displaceable along an axis extending transversely to the flow direction.

3. The release as claimed in claim 2, wherein the movable element is rotatable about an axis extending parallel to the flow direction.

4. The release as claimed in claim 3, wherein, in order to seal a through-aperture of a wall surface of the flow channel penetrated by the movable element, said wall surface including a circular arc-shaped cross-section bent about the axis, the movable element is provided with a screen bent to correspond to the wall surface and lying opposite to the wall surface.

5. The release as claimed in claim 2, wherein at least one of the movable element and the intermediate element are provided with a force deflecting inclined surface for force transmission.

6. The release as claimed in claim 2, wherein, in order to adjust a dynamic gas pressure acting on the blocking element, shaped elements are provided in the flow channel.

7. The release as claimed in claim 2, wherein the movable element actuates the shutdown mechanism through an intermediate element.

8. The release as claimed in claim 7, wherein the intermediate element is displaceable along an axis extending transversely to the flow direction.

9. An electrical switching arrangement, comprising:

at least two switching contacts, arranged in a housing, said at least two switching contacts being arranged in the course of a first current path and being configured to separate if the current flowing via the at least two switching contacts exceeds a threshold value; and a release configured to interrupt the first current path, wherein the release is configured as claimed in claim 2.

10. The release as claimed in claim 1, wherein, in order to adjust a lifting force acting on the blocking element, said blocking element is configured asymmetrically in a shape of an aerofoil.

11. The release as claimed in claim 1, wherein, in order to adjust a dynamic gas pressure acting on the blocking element, shaped elements are provided in the flow channel.

12. The release as claimed in claim 1, wherein the movable element actuates the shutdown mechanism through an intermediate element.

13. The release as claimed in claim 12, wherein the intermediate element is displaceable along an axis extending transversely to the flow direction.

14. An electrical switching arrangement, comprising:

at least two switching contacts, arranged in a housing, said at least two switching contacts being arranged in the course of a first current path and being configured to separate if the current flowing via the at least two switching contacts exceeds a threshold value; and a release configured to interrupt the first current path, wherein the release is configured as claimed in claim 1.

* * * * *